United States Patent

[11] 3,633,896

[72] Inventors: Masataro Muto; Masaaki Yagasaki; Ken Hozumi, all of Nagasaki, Japan
[21] Appl. No.: 30,207
[22] Filed: Apr. 20, 1970
[45] Patented: Jan. 11, 1972
[73] Assignee: Mitsubishi Jukogyo Kabushiki Kaisha Tokyo, Japan

[54] SHEET MATERIAL PRESSING DEVICE
5 Claims, 6 Drawing Figs.
[52] U.S. Cl. .................................................. 266/23 K, 148/9
[51] Int. Cl. ................................................... B23k 7/10
[50] Field of Search .................................. 148/9; 266/23 B, 23 K, 23 L, 23 M, 23 E

[56] References Cited
UNITED STATES PATENTS
3,119,724  1/1964  Campbell .................... 148/9

Primary Examiner—Gerald A. Dost
Attorney—McGlew and Toren

ABSTRACT: Two support structures, each having a plurality of downwardly extending, substantially equally spaced pressing members connected thereto, each with a hydraulic jack interposed therebetween, are provided extending over the entire width of a stack of sheet materials to be cut on both sides of the torch of an associated gas cutting apparatus. During a cutting operation, the support structures and those pressing members which are located within a predetermined range around the torch are operated incident to movement of the torch under the control of a numerical control system, thereby to hold the individual sheet materials in tight pressure contact with each other at portions where they are to be cut, as the torch moves.

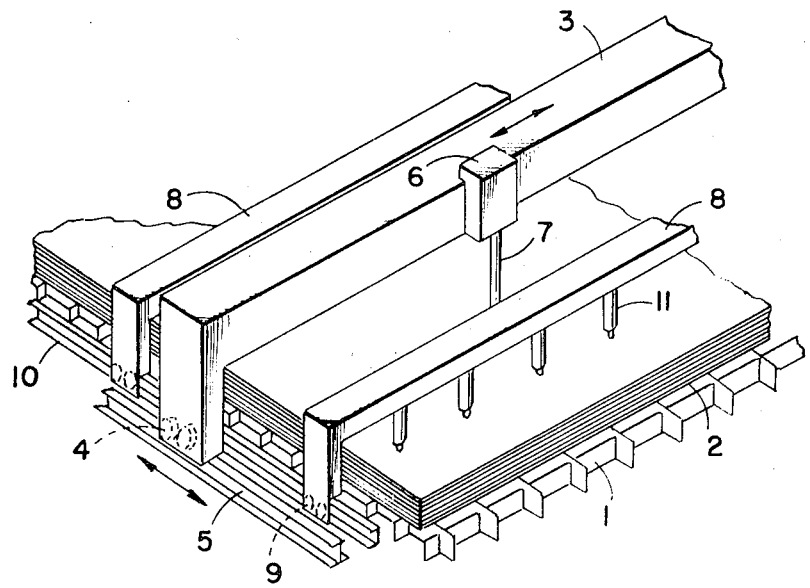
FIG. I
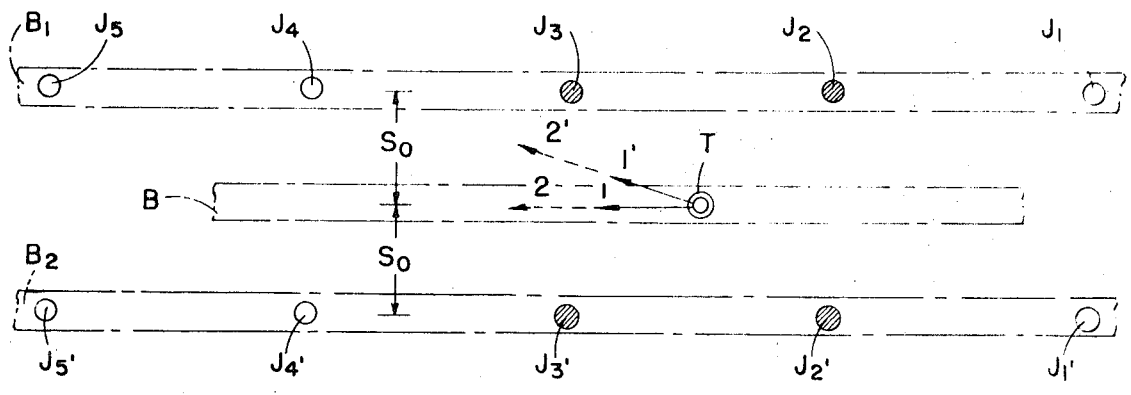
FIG. 5
INVENTORS
MASATARO MUTO
MASAAKI YAGASAKI
KEN HOZUMI

SHEET MATERIAL PRESSING DEVICE

The present invention relates to a device for pressing sheet materials to be cut, which is adapted for use with an apparatus for cutting out a plurality of members in the same configuration from a stack of sheet materials by a gas cutting method for steel sheets operated under numerical control.

An automatic gas cutting method for steel sheets operated under numerical control has already been put into practical use, and has contributed to the reduction of scribing man-hours and gas cutting manhours.

However, the apparatus heretofore used for practicing the method is capable of cutting only one steel sheet at a time, and a separate facility must be provided for pressing the sheet materials to be cut, for cutting a plurality of stacked steel sheets all at once.

In the construction of hulls, particularly those of large-sized ships for specialized use, it is becoming popular to use members of the same configuration which have been cut out from steel sheet. Under the circumstances, there has been an idea in the art that, if it is possible to cut out these members all at once from a stack of steel sheets by employing the above-described automatic gas cutting method, it would be a great contribution to a substantial reduction of manhours, an improvement of operational efficiency and a reduction of cost, in the ship building industry, and efforts are being directed to this end.

A stacked-sheet gas cutting method has already been in use, though it is not operable under numerical control. The most important factor in stack cutting is that the stacked-sheet materials to be cut are tightly pressed against each other at the portions where they are to be cut, which portions shift successively incident to the movement of a torch over the surface of said stack. In the conventional stacked-sheet gas cutting method, such problem remains unsolved and it is impossible to hold the steel sheets in complete pressure contact with each other at the central portions thereof. As a result, the conventional method has the disadvantages that well cut edges cannot be obtained and hence a desired configuration cannot be obtained precisely, and that a large amount of labor is required since the cutting operation is not automated.

There has also been proposed recently a method for automatically cutting the edges of steel sheets straight by means of a gas torch. However, the application of this method is limited to only rectilinear cutting of the steel sheet edges, because the problem of holding the central portions of the sheet materials in pressure contact with each other has not been solved in this method either.

Further, the above-mentioned prior art gas cutting method for steel sheets, operable under numerical control, is not adapted for use in stack cutting apparatus, because when steel sheets to be cut are stacked in the apparatus, the condition at the central portion of the steel sheet stack is exactly the same as that in the conventional stack-cutting apparatus for steel sheets.

However, if the condition of intimate contact between each other, of the stacked-sheets materials to be cut, is obtained at the portions opposite to the torch as the torch moves over the sheet material stack, the stack-cutting of the steel sheets will be attained, completely, even with the prior art gas cutting apparatus.

Based on such concept, the present invention aims to provide a sheet material pressing device which is adapted for use with an automatic gas cutting apparatus for stacked-sheet materials and which is capable of holding the portions to be cut, of the stacked-sheet materials, always in pressure contact with each other, no matter how the cutting torch is operated to cut the sheet materials. The sheet material pressing device according to the instant invention comprises two support structures extending over the entire width of the sheet materials to be cut on both the front and back, or the left and right, sides of the torch of an associated gas cutting apparatus carried on the support structure of gas cutting apparatus and controllably operated, these two support structures being stopped and moved repeatedly individually; and a plurality of substantially equally spaced sheet material pressing members mounted on each of the support structures along the length thereof, each with a hydraulic jack interposed therebetween, and extending downwardly from the support structure, only those sheet material pressing members which are located within a predetermined range around the torch being actuated incident to movement of the torch.

With the device of the invention, the portion of the sheet material stack to be cut in the vicinity of the torch of the gas cutting apparatus is always pressed by the sheet material pressing members. Therefore, the individual sheet materials can be held in pressure contact with each other positively at such portion and the gas cutting apparatus can fully achieve its function as a stack-gas cutting apparatus, enabling a plurality of sheet members of the same configuration to be obtained all at once, with a well cut edge.

For an understanding of the principles of the invention, reference is made to the following description of a typical embodiment thereof as illustrated in the accompanying drawing.

BRIEF DESCRIPTION OF THE DRAWING

FIG. 1 is a fragmentary perspective view of the sheet material pressing device according to the present invention;

FIG. 5 is a diagram illustrating the operation of the pressing members of the device of this invention relative to the torch and FIG. 6 is a diagram illustrating the operation of the support structures of the device of this invention relative to the torch.

DESCRIPTION OF HE PREFERRED EMBODIMENT

Figure 2:
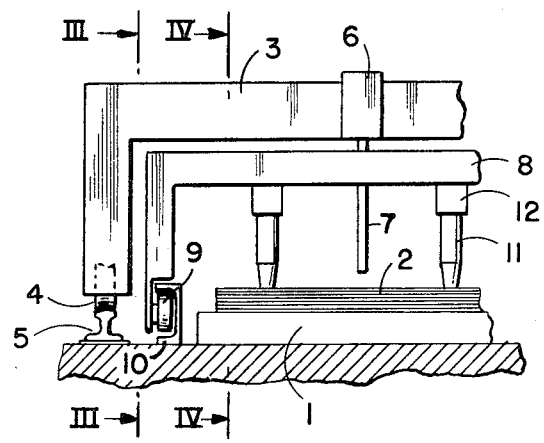
FIG. 2 is a fragmentary front elevation of the device.
Figure 3:
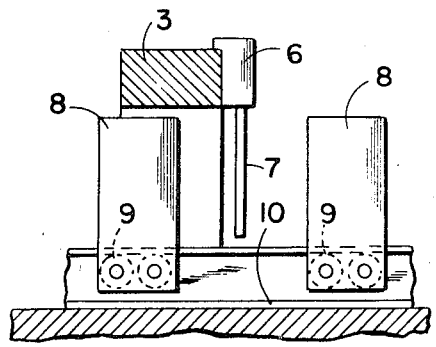
FIGS. 3 and 4 are cross-sectional views taken on the respective lines III—III and IV—IV of FIG. 2.
Figure 4:
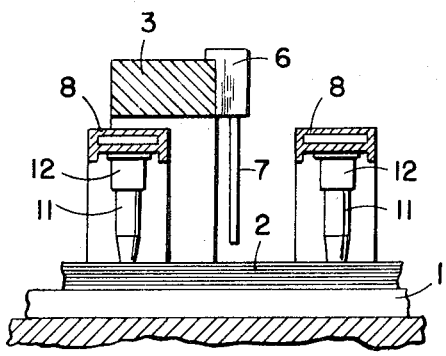

Referring first to FIGS. 1 through 4 of the drawings, reference numeral 1 designates a lattice-shaped mounting bed for mounting sheet materials (steel sheets) to be cut thereon, and 3 designates a gas cutter support structure extending over mounting bed 1 and movable longitudinally of the mounting bed as indicated by the arrows, with wheels 4, 4 at the opposite ends thereof rolling on guide rails 5 provided along the opposite longitudinal edges of the mounting bed.

Reference numeral 6 designates a gas cutter mounted on the gas cutter support structure 3 in such a manner as to be movable transversely of the mounting bed 1, and having a torch 7 connected to the center thereof.

The above-described construction of a gas cutting apparatus is already known, and the movement of the gas cutter support structure 3 relative tO the mounting bed 1 and the movement of the gas cutter relative to the support structure 3 are respectively effected by prime movers provided at suitable locations, which are not apparent in the Figures. Needless to say, the amounts of movement of these members are automatically controlled by a numerical control system. Thus, it will be seen that the gas cutter 6 with the torch 7 connected thereto is movable in two directions perpendicular to each other, i.e., in the directions longitudinally and transversely of the stack of sheet materials 2 mounted on the mounting bed 1, to locate the torch 7 in any desired position on the stack of sheet materials. Reference numerals 8, 8 designate structures for pressing members to be described later. These support structures are provided on both sides of the torch 7 and extend parallel to each other transversely over the entire width of the sheet materials 2, with a predetermined space therebetween. Each of the support structures 8, 8 is provided at the opposite ends thereof with wheels 9, 9 and is movable in the longitudinal direction of the mounting bed 1, with wheels 9, 9 rolling in rails 10, 10 which are provided along the opposite longitudinal edges of the mounting bed.

The movement of the pressing member support structures 8, 8 is effected by a conventional driving means not shown and the amount of the movement is controlled by the numerical control system. Namely, the support structures 8, 8 move and stop repeatedly, following the movement of the torch 7 for cutting operation, under the control of the numerical control system. Reference numeral 11 designates a plurality of pressing members, mentioned above, which are connected to each of the support structures 8, 8 over the entire length thereof, with a predetermined space between each other and each with a hydraulic jack 12 interposed between it and said support structure, and which extend downwardly from the support structure with the lower ends thereof lying in one and same plane. Each of these pressing members is actuated by the associated hydraulic jack when pressure fluid is supplied to the hydraulic jack. The pressing members 11 are controlled by the numerical control system in such a manner that, as the torch 7 moves, only those pressing members which are located in the vicinity of torch 7 are actuated.

The apparatus constructed as described above will operate in the following manner:

First of all, a desired number of sheet materials 2 to be cut are stacked on the mounting bed 1 and the torch 7 is positioned at a cutting starting point on the stack of sheet materials 2 by driving the support structure 3, carrying the gas cutter 6 thereon, under the control of the numerical control system. At the same time, the support structures 8, 8 are operated so as to locate them at a predetermined distance from each other, with the torch 7 interposed therebetween and a plurality of e.g., four of, the pressing members 11 are lowered to press the stack of sheet materials 2 by feeding hydraulic fluid into the hydraulic jacks 12 of respective pressing members, all under the control of the numerical control system.

The reaction of the pressure of the pressing members 11 is taken by the guide rails 10, 10 through the wheels 9, 9 at the opposite ends of the support structures 8, 8 and thus the stack of the sheet materials 2 is pressed from the top, with the individual sheet materials being held in pressure contact with each other with sufficient force.

Under such condition, the gas cutter support structure 3 and the gas cutter 6 are moved longitudinally and transversely of the mounting bed 1, either concurrently or independently, under the control of the numerical control system, so that the torch 7 carried by the gas cutter 6 moves while cutting the sheet materials. Thus, the gas cutting of the sheet materials 2 is carried out automatically.

During the cutting operation, the support structures 8, 8 are operated alternately intermittently and the fluid supply to the hydraulic jacks 12 is shifted, incident to the movement of torch 7, so as to press the stack of sheet materials 2 by a plurality of pressing members 11 in the vicinity of the torch 7.

The operations of the support structures 8, 8 and the pressing members 11 carried thereby will be practically explained with reference to FIGS. 5 and 6.

Figure 6:
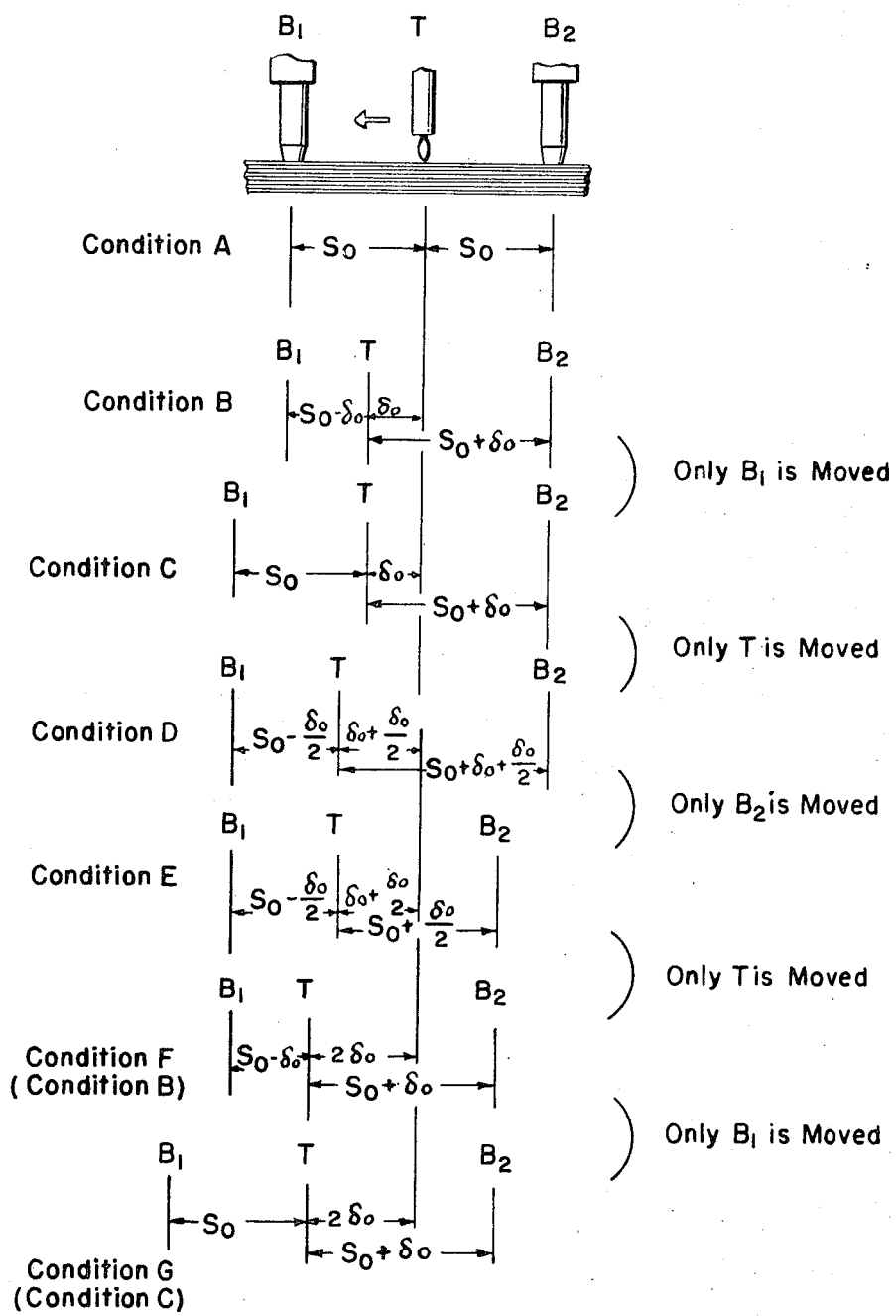

In FIGS. 5 and 6, the gas cutter support structure 3 is represented by symbol B, the torch 7 by symbol T, the support structures 8, 8 by symbols $B_1$ and $B_2$, respectively, and the hydraulic jacks 12 (the pressing members 11) connected to the respective support structures 8, 8 by symbols $J_1, J_2, J_3, J_4$ and $J_5$ and symbols $J_1', J_2', J_3', J_4'$ and $J_5'$, respectively. When the torch T is in the position shown in FIG. 4, the support structures $B_1, B_2$ are located at equal distances $S_0$ from the gas cutter support structure B, and only the hydraulic jacks $J_2, J_3$ and $J_2', J_3'$ are actuated to press the stack of sheet materials 2.

This condition lasts until the torch T reaches the point ① or ① upon movement in the direction indicated by the respective arrows. However, when the torch T reaches the point ② or ② upon further movement, the hydraulic jacks $J_4$ and $J_4'$ are actuated either concurrently or independently to press the stack of sheet materials 2, whereas the hydraulic jacks $J_2$ and $J_2'$ are released.

In the manner described, the hydraulic jacks $J_5$ and $J_5'$ are actuated and the hydraulic jacks $J_2$ and $J_2'$ are released, as the torch T further move to the left in the direction of ①→②. On the other hand, when the torch T moves in the direction of ②→②, i.e., in a direction to approach the support structure $B_1$, the operation of the support structures $B_1, B_2$ as shown in FIG. 6 is added to the above-described operation of FIG. 5.

In this case, the support structures $B_1, B_2$ as shown are moved with all of the hydraulic jacks $J_1, J_2, \ldots$ and $J_1', J_2', \ldots$ on the respective support structures being in the released state. Therefore, it will be understood that it is undesirable to move the support structures $B_1$ and $B_2$ concurrently and the phases of movement of said support structures must be displaced relative to each other.

Referring to FIG. 6, there is shown the relative positions of the torch T and the support structures $B_1$ and $B_2$. In the diagram of FIG. 6, $S_0$ ...... the standard intervals between the support structures $B_1$ and $B_2$ and the torch T $\delta_0$ ...... the distance which the support structures $B_1$ and $B_2$ move upon release of the hydraulic jacks $S_0-\delta_0$ ...... the minimum allowable interval between the torch T and the support structures $B_1$ and $B_2$ $S_0+\delta_0+(\delta_0/2)$ ...... the maximum allowable interval between the torch T, and the support structures $B_1$ and $B_2$.

Namely, on each movement of the torch T by a distance $(\delta_0/2a)$, the support structures $B_1$ and $B_2$ move alternately and take the relative positions with respect to the torch as shown in FIG. 6 respectively, under the conditions set forth below:

a. Condition A........ $B_1$ and $B_2$ are held stationary at distances $S_0$ from T.

b. Condition B....... T is moved and spaced from $B_1$ by the minimum allowable distance $S_0-\delta_0$.

c. Condition C....... $B_1$ is moved and spaced from T by a distance $S_0$.

d. Condition D......... T is moved by a distance $(\delta_0/2)$ and spaced from $B_2$ by the maximum allowable distance $S_0+\delta_0+(\delta_0/2)$.

e. Condition E....... $B_2$ is moved by a distance $\delta_0$ and spaced from T by a distance $S_0+(\delta_0/2)$.

f. Condition F (Condition B)....... T is moved by a distance $(\delta_0/2a)$ and spaced from $B_1$ by a distance $S_0-\delta_0$.

g. Condition B (Condition C)....... $B_1$ is moved and spaced from T by a distance $S_0$.

Thus, the support structures $B_1$ and $B_2$ are stopped and moved regularly and repeatedly incident to the movement of torch T. In this case, the period from the time when a support structure $B_1$ or $B_2$ is moved by a distance $\delta_0$, upon having the hydraulic jacks $J_1, J_2, \ldots$ or $J_1', J_2', \ldots$ released, and brought to a halt, to the time when hydraulic jacks $J_1, J_2 \ldots$ or $J_1', J_2', \ldots$ are actuated again, is so selected as to fall within the period in which the torch T moves a distance $(\delta_0/2)$ while cutting the sheet materials.

Although the operations of the support structures $B_1, B_2$ and the associated hydraulic jacks $J_1, J_2, \ldots$ and $J_1', J_2', \ldots$ have been explained with reference to the case wherein the torch T moved in the direction of the arrow ① or ① in FIG. 5, it should be understood that they operate in the same manner when the torch T moves to the right as viewed in FIG. 5 or toward the support structure $B_2$.

The support structure 3 and the gas cutter 6 mounted thereon are moved successively under the control of the numerical control system, while cutting the stack of sheet materials 2 by the torch 7, as described above, and during the cutting operation, the stack of sheet materials 2 is constantly pressed by a plurality of the pressing members 11 at portions which are spaced predetermined distances from the torch 7. Therefore, the individual sheet materials 2 of the stack are held in pressure contact with each other with sufficient force at the portions where they are to be cut out and as a result, a reliable, accurate cutting by the torch 7 can be achieved.

It is particularly to be noted that, since according to the present invention, it is only necessary to movably mount the two support structures 8, 8 over the entire width of the sheet materials 2 to be cut and connect a plurality of the pressing members to each of the support structures 8, 8 to extend downwardly therefrom, each with the hydraulic jack 12 interposed therebetween, the device of the invention is very simple in structure and can be produced at a low cost.

It is also to be noted that, in carrying out a cutting operation by a cutting apparatus which is provided with the device of this invention, the sheet materials 2 to be cut are always pressed together tightly by only those pressing members 11 which encircle the torch 7 and, therefore, only a small power source is sufficient to operate the hydraulic jacks 12.

A further advantage of the device of this invention is that, since the support structure 8 is not allowed to move while any one of the pressing members 11 is in action, there is no possibility that the operation of the gas cutter 6 is adversely affected by a vibration of the support structure 8 which would otherwise occur during movement of a support structure, and hence a high-precise gas cutting can be attained.

In short, according to the present invention the pressing device comprises two support structures extending over the entire width of the sheet materials to be cut on both the front and back, or the left and right sides, of the torch of an associated gas cutting apparatus carried on the support structure of the gas cutting apparatus and controllably operated, the two support structures being stopped and moved repeatedly individually incident to movement of said torch; and a plurality of pressing members connected to each of the support structures in substantially equally spaced relation, each with a hydraulic jack interposed therebetween, and extending downwardly from said support structure, only those of said pressing members which are located within a predetermined range around said torch being actuated incident to movement of said torch to press the sheet materials. Therefore, the device is simple in both construction and operation, and is capable of holding a plurality of stacked-sheet materials to be cut in pressure contact with each other very effectively, during cutting operation of a steel sheet gas cutting apparatus. By employing the pressing device of this invention, efficient, highly precise, automatic stack cutting by a gas cutting apparatus becomes possible, which is a great contribution to the ship building industry in respect of reduction in working manhours.

What is claimed is:

1. A pressing device, for compressing a stack of sheet material, stacked upon a stack support, during cutting of the stacked-sheet material by cutting apparatus including a cutting tool directing a hot gaseous cutting medium against the stacked-sheet material and controllably moved, in a predetermined cutting pattern, over the stack, said pressing device comprising, in combination, two support structures extending over the entire width of the stack on opposite sides of said tool; means mounting said support structures for individual positional adjustment over the stack in accordance with the controlled movement of said tool over the stack; a plurality of pressing members carried by each support structure in substantially equally spaced relation therealong and extending downwardly toward the stack; and means operable, during such controlled movement of said tool over the stack, to press only those pressing members within a predetermined range around said tool against the stack, to firmly compress the sheet material during cutting of the stack thereof.

2. A pressing device, as claimed in claim 1, including means coupled to said support structures and absorbing the reaction force due to pressing of said pressing members against the stack.

3. A pressing device, as claimed in claim 1, in which said last named means comprises respective jacks interposed between each pressing member and the associated support structure.

4. A pressing device, as claimed in claim 3, in which said jacks are hydraulic jacks.

5. A pressing device, as claimed in claim 1, in which said mounting means comprises rails extending along each side of the stack and wheels on said support structures engaged in said rails; said rails restraining said wheels against upward movement when said pressing members are pressed against the stack.

* * * * *